June 2, 1970  KUNITOSHI TEZUKA  3,514,921
DEVICE FOR REFUSE DISPOSAL BY COMPRESSION
Filed May 6, 1968  6 Sheets-Sheet 1

INVENTOR.
KUNITOSHI TEZUKA
BY
AGENT

June 2, 1970 KUNITOSHI TEZUKA 3,514,921
DEVICE FOR REFUSE DISPOSAL BY COMPRESSION
Filed May 6, 1968 6 Sheets-Sheet 4

INVENTOR.
KUNITOSHI TEZUKA
BY *Jab Hein*
AGENT

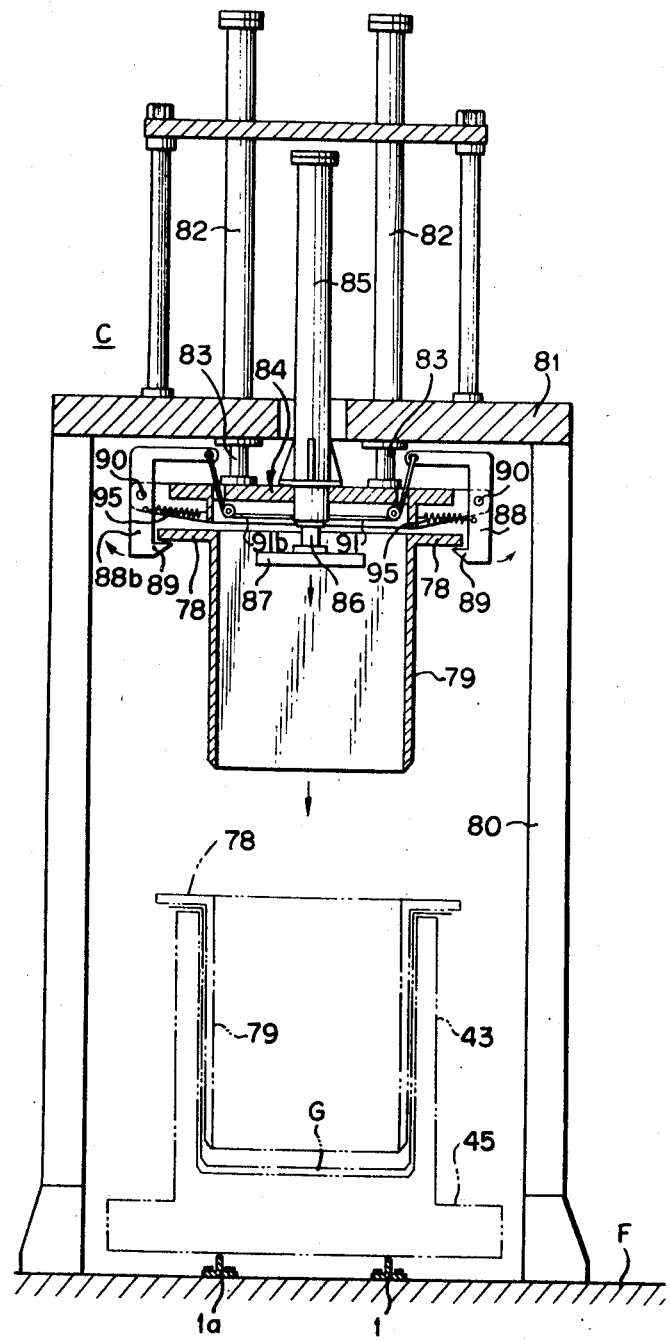

June 2, 1970  KUNITOSHI TEZUKA  3,514,921

DEVICE FOR REFUSE DISPOSAL BY COMPRESSION

Filed May 6, 1968  6 Sheets-Sheet 6

INVENTOR.
KUNITOSHI TEZUKA
BY *Jab thein.*
AGENT

United States Patent Office 3,514,921
Patented June 2, 1970

---

3,514,921
DEVICE FOR REFUSE DISPOSAL BY COMPRESSION
Kunitoshi Tezuka, 34 7-chome, Minamisuna-machi, Koto-ku, Tokyo, Japan
Continuation-in-part of application Ser. No. 569,991, Aug. 3, 1966. This application May 6, 1968, Ser. No. 726,972
Claims priority, application Japan, June 30, 1967, 42/41,531
Int. Cl. B65b 1/24, 37/06, 43/54
U.S. Cl. 53—124                                                     11 Claims

---

ABSTRACT OF THE DISCLOSURE

Device for refuse disposal by compression applied to the refuse, particularly of garbage, trash, waste and the like, comprising means for shaping and compressing the refuse into substantially solid refuse blocks of predetermined shape, including a bed, a shaping box and a force plate reciprocable in the box for treating the refuse; wrapping means for applying a cover to the solidified refuse blocks; and means for coordinating the successive shaping and wrapping steps for continuous operation of the device.

---

The present invention relates to a device for refuse disposal by compression applied to the refuse, such as garbage, trash, waste and the like, especially from kitchens, food processing factories, food stores or the like, daily discharged in huge quantities.

This is a continuation-in-part of the co-pending patent application Ser. No. 569,991 of Aug. 3, 1966, entitled "Device for Refuse Disposal," of the same inventor. The application matured into U.S. Pat. 3,451,190 of June 24, 1969.

The amounts of refuse discharged nowadays in highly populous urban areas, and in the industrial mass production of foods, are quite substantial so that the effective disposal of refuse is an increasingly critical and important problem when aiming at maintaining proper environmental sanitation.

As a heretofore known example of refuse disposal, incineration should be mentioned which, however, is too expensive in view of the large amounts of fuel as well as time that have to be spent, particularly when disposing of wet garbage since it consumes much larger amounts of fuel. Moreover, the discharged soot, smut or noxious gases produced due to incomplete combustion will give rise to atmospheric pollution.

The underground or underwater dumping of refuse, another example of hitherto practised means or manner of disposal, requires heavy and time-consuming transportation, as well as vast spaces or large bodies of water for burying the refuse in its original, unaltered condition, as collected; this would evidently result in most unsanitary conditions which have to be avoided, as is now generally recognized.

In view of the afore-mentioned circumstances, a refuse disposal device has been proposed, effective in shaping the refuse into compact blocks by compressing means, in the afore-mentioned Pat. 3,451,190. The device according to that earlier application of the same inventor has adopted preferably horizontal-type compressing means which includes a compression box and a force plate which latter is inserted in said box and is horizontally reciproca-ble therein; thus the lay-out of the device in its entirety will require a wide floor area.

As to the compression box, it cannot stand long periods of compression operation under high pressure and, therefore, the compressing force to be employed for the block shaping is necessarily limited. Consequently, there remains a possibility of further improvement in the earlier device so as to obtain solid blocks compressed more powerfully and more compactly.

The object of this invention is to provide an improved device for shaping the refuse into solid blocks of a predetermined dimension, more powerfully compressed and compactly wrapped up with a cover material, than in the afore-mentioned co-pending patent application.

Another object of this invention is to furnish the device with wrapping means allowing a cover material to be applied more easily to the solidified or compacted refuse blocks.

According to one of the principal features of the improved refuse disposal device of this invention, a shaping or compressing device is provided which is of the vertical type, and has a shaping or compression box mounted on a bed for shaping the refuse into dehydrated solid blocks, by applying powerful compression, as well as a force plate or compressive member vertically reciprocable into and out of the shaping box. The invention also provides wrapping means for applying a cover material around the shaped refuse blocks; the blocks are again compressed by the shaping or compressing means, and thus the cover tightly adheres to the blocks.

For the force plate of the vertically operating shaping means, there are available a variety of types such as a flat board-type member for compressing with the entire surface of its compressive flat plate, or a rotary spot compressing member for compacting the refuse by partly powerfully pressing with a force plate, the latter having a corrugated face, and then applying successively the partial compression to the refuse in its entirety by rotating the force plate gradually by a certain extent.

As to the wrapping cover for the blocks, plastic sheets such as vinyl chloride, polyethylene or the like may be used, reinforced preferably with wire netting or the like; also, sheet-like covers may be used such as plastic sheets, metallic foils, with or without reinforcement as mentioned before. Alternately, reticular covers such as wire nettings, strips of canvas, steel bands or the like may also be employed. If it is important to shut off offensive odors, film-like wrapping covers or said sheet-like covers are used; however if this is not required, such as in direct incineration, the reticular cover is suitable.

In addition, for wrapping purposes, the blocks may be covered with the afore-mentioned band-shaped material cut to a predetermined dimension by closing the seam of said material, or the blocks may be wrapped similarly but in cases made previously from said material.

According to the present invention, tremendous piles of refuse may be compacted and compressed so that the moisture is squeezed out to a substantial degree, whereupon the compacted blocks are wrapped up with the cover, so that very compact, solid, easily portable blocks are obtained which have a very small volume. When such blocks are buried underground or underwater, sanitary disposal of the refuse is achieved within a limited space; when incinerated, expenses are greatly reduced and operations will become more efficient; on the other hand, transportation of the refuse is greatly simplified. Moreover, the compacted refuse blocks may be used to develop land by reclaiming from the sea, from rivers, and the like.

It should be noted that the afore-mentioned earlier Pat. 3,451,190, as well as the present application relate to exemplary devices, for disposing of refuse, according to applicant's co-pending application, also filed on Aug. 3, 1966, entitled "Method of Refuse Disposal," Ser. No. 569,987. While the last-mentioned application covers various other procedural steps suitable for that inventive method, the present application relates only to an improved, exemplary, preferred device for carrying out that method.

The present invention will be better understood, and additional advantages thereof will become more apparent, upon perusal of the following description of the aforementioned preferred embodiment thereof, taken in conjunction with the appended drawings, wherein:

FIG. 7 is an enlarged, cross-sectional view of a portion of a casing inserting-removing device, similarly forming part of the set-up, taken along line VII—VII of FIG. 1;

Figure 1:
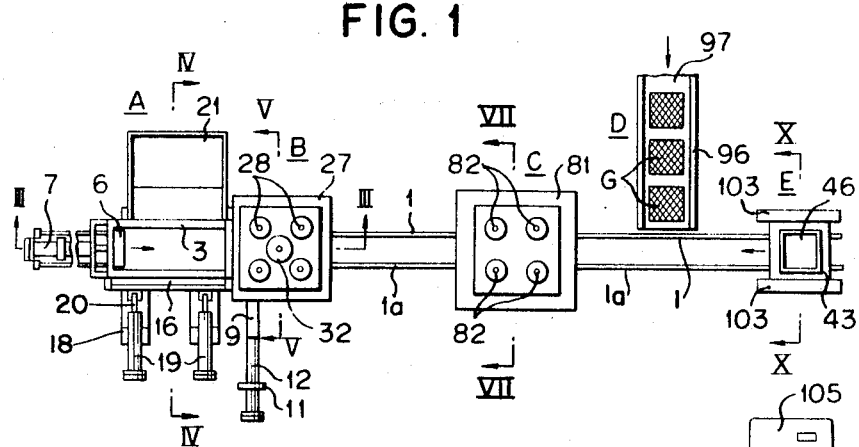
FIG. 1 is a top plan view of the improved device or set-up for refuse disposal, according to the present invention.
Figure 2:
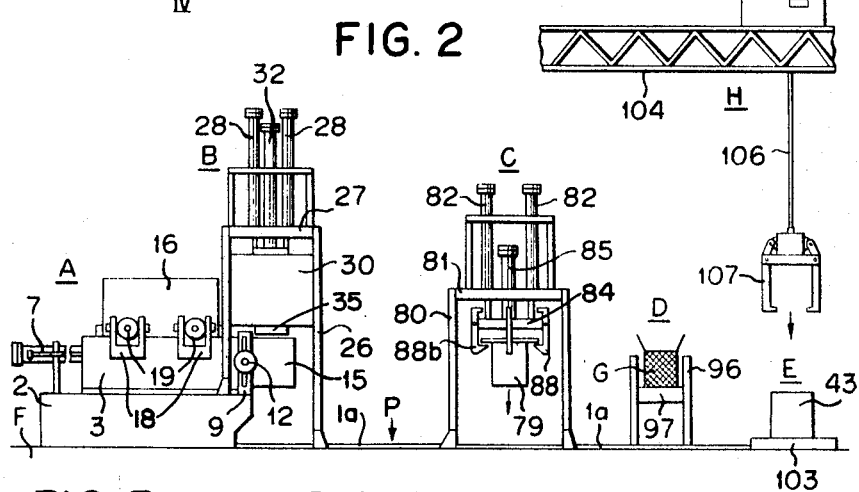
FIG. 2 is a side view of the set-up shown in FIG. 1, with a crane mechanism added thereto.
Figure 3:
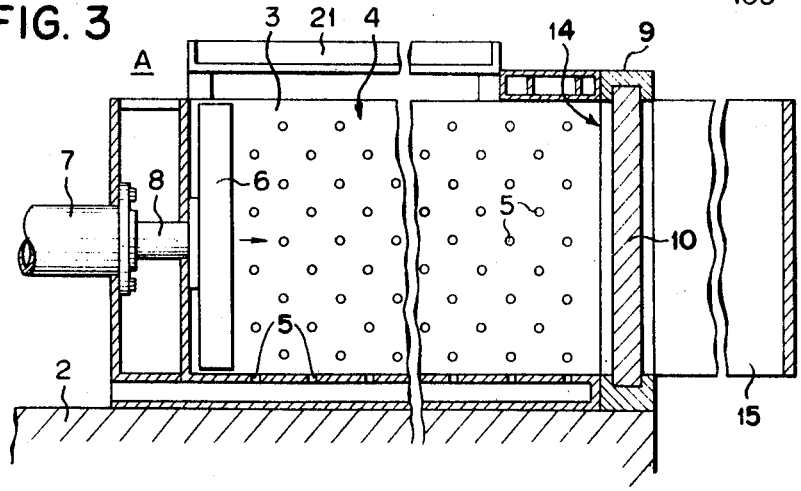
FIG. 3 is an enlarged, vertical, longitudinal cross-sectional view of a preliminary compacting device forming part of the inventive set-up, partly and schematically shown, and taken along line III—III of FIG. 1.
Figure 4:
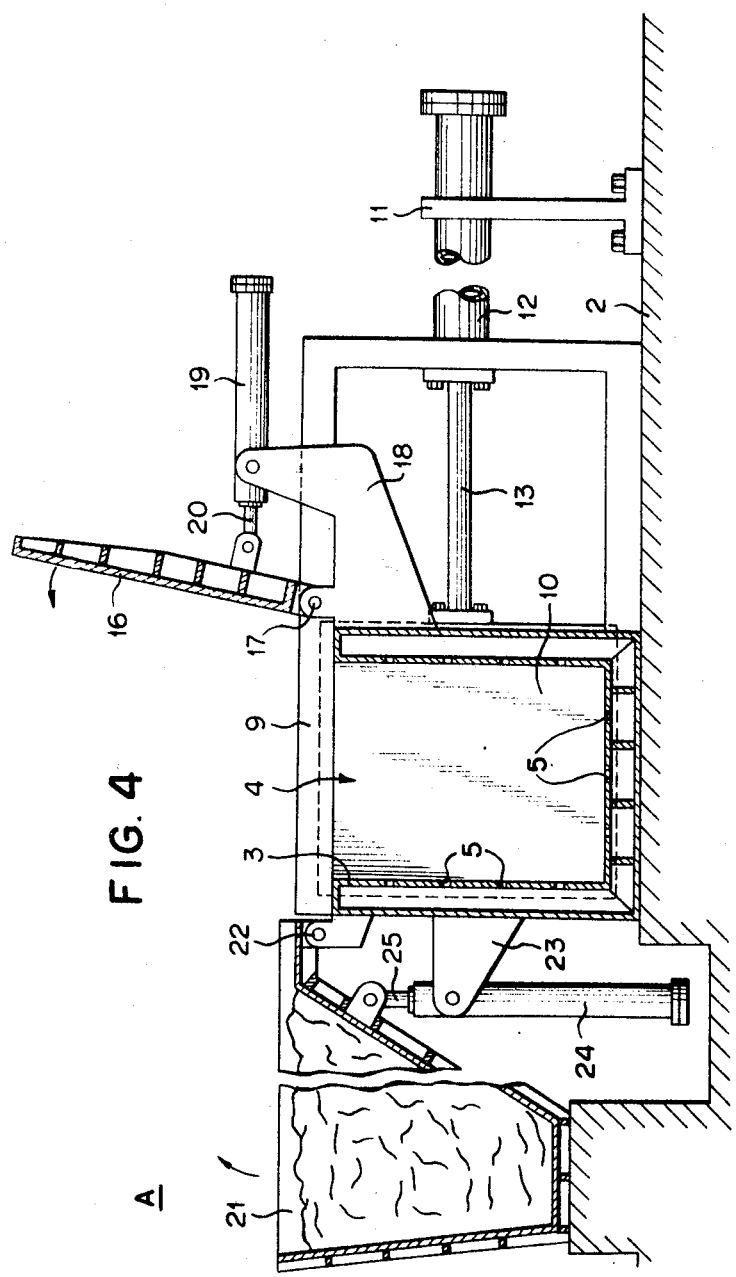
FIG. 4 is another vertical, transversal cross-sectional view of the same device as shown in FIG. 3, taken along line IV—IV of FIG. 1.
Figure 5:
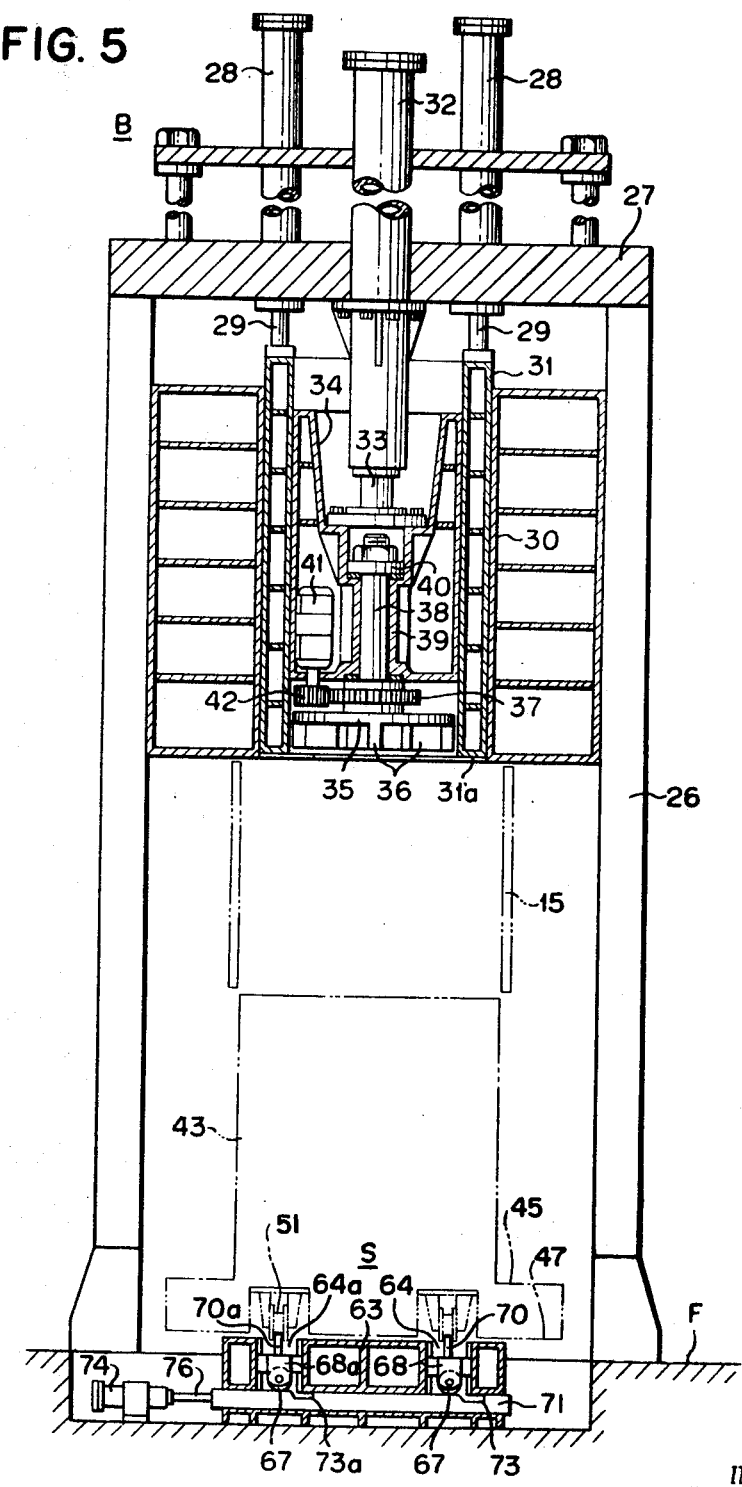
FIG. 5 is an enlarged, vertical, cross-sectional view of a second or main compacting or shaping device also forming part of the set-up, partly and schematically shown, and taken along lines V—V of FIGS. 1 and 6.
Figure 6:
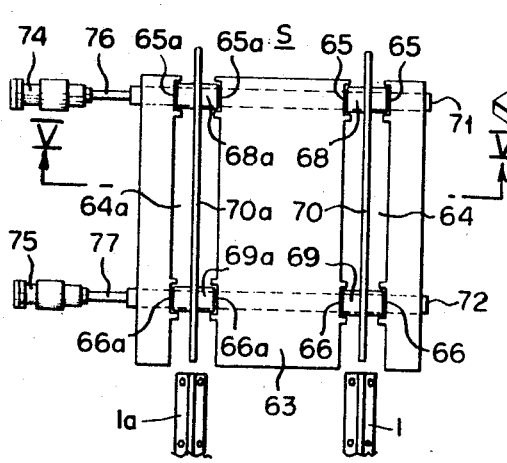
FIG. 6 is an enlarged top plan view of the floor underneath the device of FIG. 5.
Figure 9:
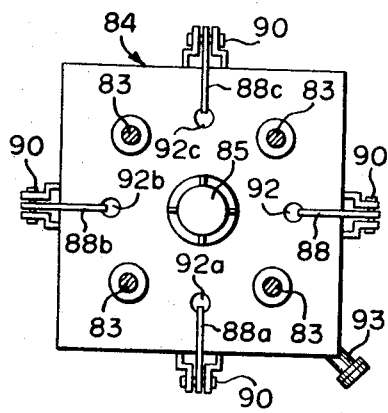
FIG. 9 is a plan view of an elevator plate of the device shown in FIG. 7.
Figure 9A:
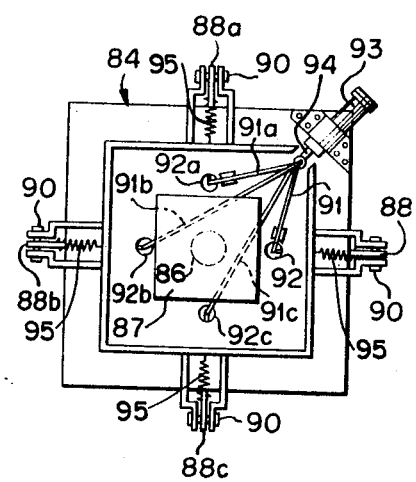
FIG. 9A is a bottom view of the elevator plate of FIG. 9.
Figure 10:
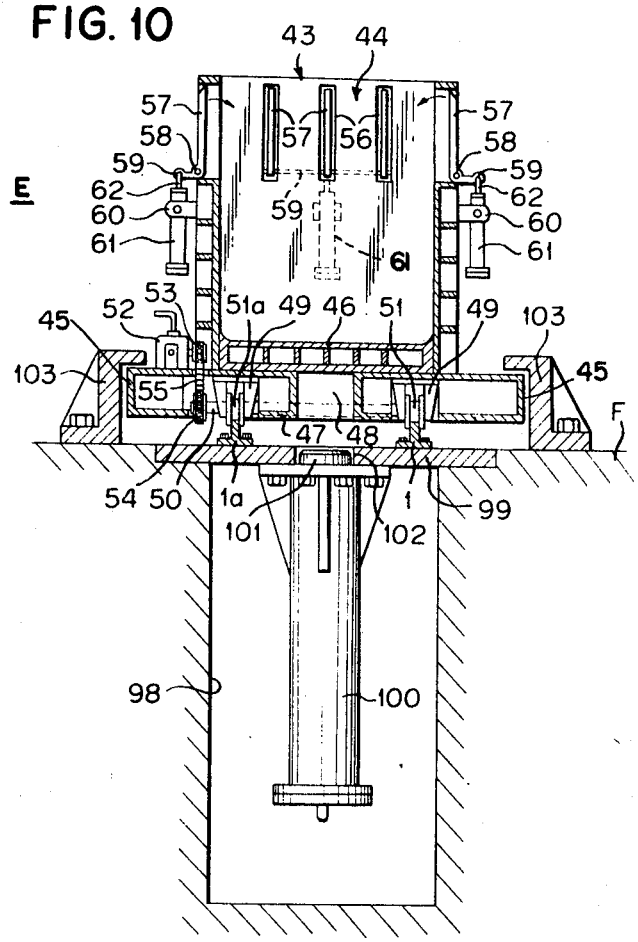
FIG. 10 is an enlarged, cross-sectional view of a portion of a pushing device, for removing the completed refuse blocks from a shaping box, taken along line X—X of FIG. 1.

It will be seen from the drawings, particularly FIGS. 1 and 2, that on and alongside two straight rails 1, 1a, placed on the floor F, there are provided, in succession from left to right as viewed in the drawing, the following devices forming part of the inventive set-up:

(1) A preliminary compacting device A (see also FIGS. 3 and 4);

(2) A second or main compacting or shaping device B connected with device A (see also FIGS. 5 and 6);

(3) A device C for inserting and removing a casing 79 into and from a shaping or compression box 43 (both to be described somewhat later in full detail) of the device B, at a certain distance therefrom (see also FIGS. 7, 9 and 9A);

(4) A so-called dropping device D for supplying cover material for the operation of the device, shown in FIGS. 1 and 2 only; and (5) A device E for pushing out or extruding the compactly shaped and wrapped refuse blocks from the shaping box 43 (see also FIG. 10).

A crane mechanism H will also be described in conjunction with the devices A through E, shown in FIG. 2 alone. Besides further mechanisms and devices to be explained and described as the specification proceeds, a device S should also be mentioned which cooperates with the device B as well as the box 43 and is illustrated in FIG. 6. The specification will substantially follow the above listing of the major devices forming the inventive set-up, as follows.

The preliminary compacting device A (see FIGS. 1 to 4) is of a type for compressing horizontally. As is shown particularly in the enlarged FIGS. 3 and 4, it includes a compacting box 3 on a bed 2 that is set adequately higher than the floor F; an inlet 4 is provided on the upper side of the box 3 or charging thereinto refuse lumps, and there are a number of holes 5 for discharging water, at the bottom as well as in both side walls, as shown.

In the box 3 there is horizontally slidably inserted a compacting member or force plate 6 of the plate-board type which is connected with a ram 8 of an oil-pressure cylinder 7 mounted onto the rear end of the box 3 and so disposed that by virtue of said cylinder 7 the compacting member 6 may slidably reciprocate in the compacting box 3.

On the fore end of the box 3, there is mounted a door frame 9 into which a door 10 is inserted so as to be slidable from the outside. The door 10 is connected with a ram 13 of an oil-pressure cylinder 12 held by a bracket 11, which is so adapted as to open and shut an opening 14 at the fore end of the box 3. Onto the door frame 9 there is horizontally mounted a square-shaped guide frame 15 in such a manner as to project into the second or main compacting device B, as will be described later in detail.

A lid 16 of the inlet 4 of the box 3 is mounted on one side of the box with a pivot 17, and rams 20 of two oil-pressure cylinders 19, carried swingably by two brackets 18, are connected to the top of the lid 16, that opens and shuts the inlet 4 swingably by the action of the cylinders 19.

A hopper 21 is mounted on one side, opposite the lid 16, with a pivot 22 onto the box 3, and a ram 25 of an oil-pressure cylinder 24, carried swingably by a bracket 23, is connected to the lower side of the hopper 21, which swings by the action of said cylinder 24.

The main compacting or shaping device B is a type for compressing vertically. Referring to FIGS 5 and 6, and particularly to the former, a tower 26 is set up around the guide frame 15 projecting out of the compacting box 3, and a top member 27 of the tower 26 is attached vertically with four oil-pressure cylinders 28. At the lower end of each ram 29 of said cylinders 28 there is mounted on a compressive member 31 slidably inserted into a square-shaped guide cylinder 30 mounted on the tower 26. The members 31 are cylindrical with their outsides made square and the insides shaped in a circular fashion.

Furthermore, on said top member 27 there is centrally mounted an oil-pressure cylinder 32, substantially parallel with the cylinders 28. Onto the lower end of a ram 33 of the cylinder 32 a cylindrical supporting member 34 is mounted, slidably inserted between said compressive members 31, and by the member 34, a rotary compressive member 35 is held in a freely rotatable manner. The manner 35 has a disk-shaped top portion and it has thereunder a plurality of projections 36, as well as a gear 37 on its top and a shaft 38 extending therefrom upwards in vertical direction.

The shaft 38 of the member 35 is inserted into a bearing 39 of the supporting member 34 and is suspended from a collar 40 fitted to the upper end of the shaft 38. Another gear 42 is secured to the driving shaft of a motor 41 mounted onto the member 34, and adapted to mesh with the aforementioned gear 37 so as to transmit rotation from the motor 41 to the compressive member 35 and its lower projections 36.

The members 31 serve to compress by means of respective flat compression faces 31a the outer circumference of the refuse in a mobile compression box 43 (shown in full lines in FIG. 10 and in phantom illustration in FIGS. 5 and 7). The members 31 are lowered inside the box 43 by the action of the fore-mentioned cylinders 28. The rotary compressive member 35 successively moves by predetermined degrees, driven by the motor 41, and it will be lowered into the box 43 by the action of the cylinder 32 after each rotation thereof so that it can perform a partial compression by means of the projections 36.

We now come to the description of the pushing device E shown in FIGS. 1, 2 and 10. In these figures, the afore-mentioned mobile compression box 43 is also shown at position E, as in FIG. 10. The box 43 is of rectangular cross-section with an inlet 44 on its top and a flange 45 protruding outwardly at its lower end, and also having an elevator plate 46 slidably lodged therein. Furthermore, the box 43 has a bottom plate 47 provided with an opening 48 passing through the bottom, in the center thereof. The plate 47 is mounted with a plurality of bearings 49 by which two axes 50 are rotatably held whose ends have wheels 51, 51a respectively secured thereto.

An oil-pressure motor 52 is mounted on the flange 45, and a chain 55 runs from a sprocket 53 secured to the driving shaft of the motor 52 to a similar sprocket 54 on one of said axes 50. The chain 55 transmits the rotation of the motor 52 to the axis 50 whereby the wheels 51, 51a are driven, thus moving the compression box 43 along the rails 1, 1a (always referring to FIG. 10).

Figure 11:
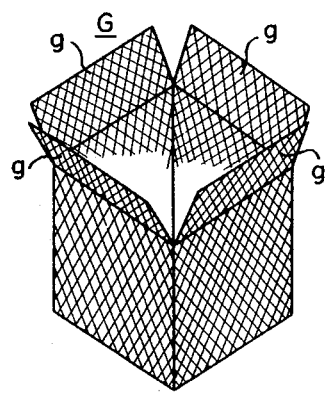
FIG. 11 is a perspective view of a cover case used in the inventive device and its operation.

FIG. 11 shows a cover case G which is provided with flaps g. The box 43 is provided with a device for folding said flaps g of the cover case. Preferably on all four sides of the square-shaped box 43, there are provided vertical, elongated slots 56, and each slot is fitted with a swingable bell-crank-type folding lever 57 movable about a pivot 58. The upper, longer arm of each lever 57 may enter the respective slot 56 while the lower, shorter arm is connected with an axis 59 to which a ram 62 of an oil-pressure cylinder 61 is operatively connected. The cylinders 61 are swingably supported by respective brackets 60, as shown in FIG. 10. In the drawing, the non-operative or rest positions of the levers 57 are shown; by the action of the cylinders 61, the levers 57 are made to fall into the compression box 43 so as to assume substantially horizontal positions with the longer arms, thus folding the flap g of the cover case G inwardly, starting from the lateral edges where the flaps g are attached.

When compacting refuse with the main device B by the aid of the box 43, it should be noted that the floor of the device B is provided with a unit S (see FIG. 6) for directly receiving and supporting the bottom plate 47 of the box 43 with another bed plate instead of its wheels 51, 51a, as will be explained hereunder.

With reference to FIGS. 5 and 6, the floor F is provided with a substantialy square bed plate 63 in which grooves 64, 64a are provided so as to extend in the same linear direction as the afore-described rails 1, 1a. Both grooves are provided with guide channels 65, 66 and 65a, 66a, in pairs corresponding to the respective front and rear ends of the grooves. The channels lodge sliding pieces 68, 69 and 68a, 69a, respectively, having rollers 67 at the lower ends thereof. Shorter rails 70, 70a, separated from the rails 1, 1a, are placed on the sliding pieces 68, 69 on one side and on pieces 68a, 69a on the other.

In order to elevate the sliding pieces, cam rods 71, 72 are slidably carried in positions corresponding to the afore-mentioned sliding pieces at the respective front and rear ends of the bed plate 63; in the parts corresponding to the sliding pieces of both rods, there are formed respective concaves 73, 73a. The protruding ends of the rods are connected respectively with rams 76, 77 of oil-pressure cylinders 74, 75 whose synchronous action causes the rails 70, 70a to be lowered and the compression box 43 to be directly carried on the bed plate 63, upon reciprocation of the cam rods 71, 72, when the concaves 73, 73a come into contact with the sliding pieces 68 . . . 69a, and further causes the rails 70, 70a to be elevated so as to resume their originally transportable condition when the concaves leave the afore-mentioned positions.

Figure 8:
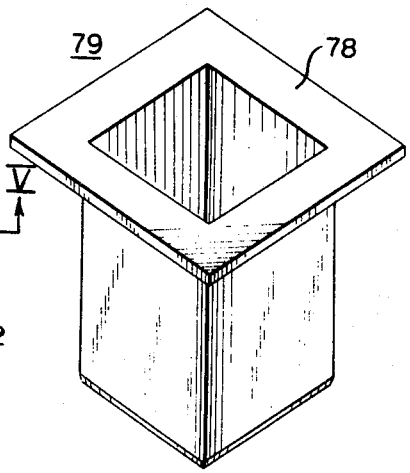
FIG. 8 is a perspective view of a casing used in the inventive device and its operation.

We now come to the description of the casing inserting and removing device C as shown in FIGS. 1, 2, 7, 9 and 9A. The device serves to insert into and remove from the mobile compression box 43, as shown in FIG. 8, a square casing 79 (mentioned before) which has a flange 78 at its upper edge and is open at both the upper and the lower ends. Referring now to FIG. 7, a top member 81 of a tower 80 is vertically mounted with four oil-pressure cylinders 82 onto whose rams 83 an elevator plate 84 is mounted at ther lower ends.

The plate 84 is centrally mounted, vertically reciprocable by way of the cylinders 82, and carries an oil-pressure cylinder 85 onto whose ram 86 a pressing plate 87 is secured at its lower end. There are four tongs 88, 88a, 88b, 88c for gripping the casing 79. The tongs have at their respective lower ends hooks 89 which are adapted to engage the flange 78 of the casing 79. The tongs are carried by pivots 90, preferably at equal intervals, on the circumference of the elevator plate 84, as can be seen from FIGS. 9 and 9A.

The upper ends of the tongs 88 . . . 88c are respectively coupled with wire ropes 91, 91a, 91b, 91c which are passed through holes 92, 92a, 92b, 92c provided on the plate 84 toward the back or bottom side thereof where the ropes are bound together and coupled with a ram 94 of an oil-pressure cylinder 93 provided at one corner of the plate 84. The cylinder is so arranged that each of the tongs 88 . . . will be opened upon its actuation by traction of the ropes 91 . . . , and will then be closed by respective springs 95 when the ropes are released. If necessary, small rollers may be provided for guiding the ropes, as shown schematically for two of them in FIG. 9A.

The wrapper cover dropping or supplying device D (shown in FIGS. 1 and 2) serves to drop into the mobile compression box 43 one of the cover cases G (FIG. 11), with its upper opening facing upward, the case G being preferably made from vinyl sheet reinforced with wire netting, and having four flaps g extending about the top opening edge, as shown. The cover cases G are delivered during the operation of the inventive device on a belt conveyer 97 or the like means which is provided with a frame 96, located at right angles to the rails 1, 1a.

Figure 12:
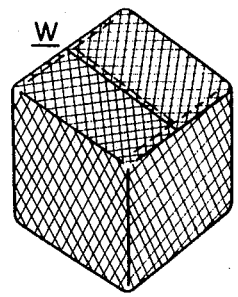
FIG. 12 is a perspective view of a compacted, shaped and wrapped refuse block made with the inventive device.

The afore-described pushing device E is provided for removing the compacted, wrapped refuse blocks W, as shown in FIG. 12, from the compression box 43 where they are completed. A pit 98 is formed in the floor at the removal position, the top or cover 99 of the pit being mounted vertically with an oil-pressure cylinder 100 whose push ram 101 is adapted to protrude upward past a hole 102 made in the cover 99. The rails 1, 1a pass above the cover 99. Outside of the rails, in the area of the device E, there are provided supporters 103 on both sides, having a substantially L-shaped cross-section, and serving to support the flange 45 of the box 43, in a parallel arrangement with the afore-mentioned rails 1, 1a.

When the box 43 is at rest in the device E, after having traveled along said rails 1, 1a, the ram 101 (see FIG. 10) will be made to protrude into the hole 48 in the bottom of the box 43 so as to push the elevator plate 46 upward, by the action of the cylinder 100, so that a completed refuse block W in said box 43 is exposed, at least partly, at its outer portion so that it can be removed from the box. When the ram 101 is moved upward, the box 43 is held down by the supporters 103 which engage the flange 45, so as to keep the box 43 from being raised.

Above the pushing device E, there is provided an overhead crane mechanism H (see FIG. 2) for lifting and delivering the completed refuse blocks W to a predetermined location. The crane mechanism, conventional as such, may comprise a beam 104 having rails, a trolley 105 having a winch, and ordinary tongs 107 or similar means fitted to a wire rope 106 suspended from the trolley; any similar conventional expedient may of course be used for removing and transporting the refuse blocks W.

It will be understood that the mobile compression box 43, while having been shown at the position E, in conjunction with the cooperating pushing device E, could be illustrated in FIGS. 1 and/or 2 at some other position between the shaping device B and the dropping device D; in fact, the devices B and C are both shown with phantom illustrations of the box 43 (in the respective FIGS. 5 and 7) for a better understanding of their operation, and correlation with their structural parts. In FIG. 7, details of the lower flange 45 and the wheels 51, 51a of the box 43 have been omitted.

Now, the suggested operation of the exemplary, preferred set-up of the inventive refuse disposal device will be described in a continuous manner, and the description will set out from the mechanical, structural details as shown in the appended drawings. Referring first to FIGS. 1 and 2, the mobile compression box 43 (shown at the right-hand end of the set-up) is empty as a completed refuse block W has already been removed therefrom at the device E, e.g. by means of the mechanism H. The box 43 is made to travel leftward on the rails 1, 1a, as viewed in the drawing, by actuating the motor 52, and the box is brought to a stop in front of the dropping device D. Hereupon, the conveyer 97 is actuated and one cover case G is thereby dropped or put into the box 43 in a top-open position, whereupon the conveyer is stopped.

The box 43 is thence moved further leftward into the inserting and removing device C. The tongs 88 of the device have preliminarily been arranged to hold a casing 79, and the same is then inserted into the cover case G which is inside the box 43, by virtue of lowering the elevator plate 84 upon actuation of the cylinder 82 in a conventional manner. Thereafter, by pulling the wire ropes 91 through the action of the cylinder 93, the tongs 88 are opened and thus the casing 79 is released. Once the plate 84 is raised by the repeated action of the cylinder 82 in opposite direction, the casing 79 will be left behind within the compression box 43, and its flange 78 will hold the flaps g of the cover case G in an open position so that the throwing of the refuse blocks into the compression box 43 and the case G is made possible.

In the next stage, the box 43 is made to travel still further leftward, as far as the front (or righthand side) of the preliminary compacting device A, that is, exactly under the shaping device B (main compacting device).

While the box 43 has been handled as described in the foregoing, the preliminary compacting of the refuse lumps is carried out in the device A. As will be understood from the preceding description of this device, the refuse as collected is introduced into the hopper 21 which is thence swung upward by the action of the cylinder 24 so as to throw the refuse into the box 3, followed by closing of the lid 16 by the action of the cylinder 19. Thereupon the compacting member or force plate 6 is advanced horizontally by the action of cylinder 7 so as to compress and reduce the volume of the refuse lumps as well as to squeeze out the moisture therefrom. The water flows out through the numerous holes 5 of the box 3 and is discharged through conventional draining means.

When the mobile compression box 43 is shifted to the front of the preliminary compacting device A, as mentioned before, the door 10 is opened by the action of cylinder 12, the pre-compacted refuse is removed by way of the opening 14 and thrown into the casing 79 within the box 43 by advancing the plate 6 up to the door 10, again through the action of the cylinder 7. The insertion of the refuse block can be smoothly carried out since it is guided into the casing 79 so that no creases or damage can occur to the cover case G. After the throw is finished, the operation as has been described in the above is repeated over again for the pre-compression or compacting of the refuse lumps.

Subsequent to the preliminary compacting, the second or or main compacting is carried out by means of the shaping device B. Prior to the actual operation, the cam rods 71, 72 are retracted to lower the rails 70, 70a by the action of cylinder 74 of the device S, and thereby the bottom plate 47 of the box 43 is brought to be carried on the bed plate 63. Under this condition, the compressive members 31 and 35 are vertically lowered into the box 43 to compress the refuse upon actuation of the cylinders 28 and 32, respectively.

Operation of one or more of the members 31 is carried out by admitting hydraulic fluid into the respective cylinder or cylinders 28. A similar compressing operation by way of the member 35 is carried out as follows: Subsequent to a compression for a short while, the member 35 is elevated whereupon it is rotated a certain degree by way of motor 41 and thereafter another compression is carried out; the angular rotation and the compression are repeatedly carried out. By virtue of such a compressing operation the refuse can be shaped into very compact, solid, cubic blocks.

After the shaping or compacting is done, the box 43 is made to travel rightward and is brought into the inserting and removing device C wherein it is made to stop. Thereupon the elevator plate 84, which is in its tongs-open condition, is lowered near to the box 43 by the action of cylinder 82. The tongs 88 are thence closed by way of cylinder 93 for actuating the former so as to hold firmly the flange 78 of the casing 79. Following this, the plate 84 is elevated by means of cylinder 82, thereby lifting the casing 79 while the pressing plate 87 simultaneously protrudes and may be lowered with the cylinder 85, the plate serving to push down the refuse block into and through the box 43. From these two operations it will be understood that the casing 79 alone is extracted from the box 43 while the refuse block and the cover case are left behind.

The mobile compression box 43 is thereafter made to travel leftward again, and stopped at a wrapping position P (see FIG. 2) where the flaps g of the cover case G are folded by the mechanism described in connection with FIG. 10 (pushing device). The folding is carried out by first actuating the cylinder 61 on one side only of the box 43 so that the three levers 57 on that side are swung inside the box, thereby folding the flap g of that side only toward the inside of the refuse block, whereafter the second flap is folded on the opposite side by a corresponding motion of the levers 57, actuated by another cylinder 61, and so forth until all four flaps g are securely folded down so as to present the completed refuse block W as shown in FIG. 12.

It will be understood that it is desirable to make each set of the levers resume its original, rest position after every folding. The edges of the flaps g thus folded are secured with a conventional fastener or stuck to each other and to the compacted refuse with an adhesive. The later may of course also be applied before each flap is folded down.

After the wrapping step is completed, the box 43 is again moved to the B device wherein the refuse block W is preferably subjected to a final compacting or compressing step by an operation as explained before. Consequently, the cover of the compacted, wrapped refuse block tightly adheres thereto under pressure, and the block has a substantially unified, solid body of predetermined dimensions.

Subsequently, the box 43 is made to travel rightward again and stop in the position E at the pushing device where the elevator plate 46 is pushed up to near the opening 44 of the box by the action of the cylinder 100 whose ram 101 now projects into the box 43. By so doing, the completed refuse block W, resting on the plate 46, is gradually exposed outside and above the box 43. The block can thus be lifted by the tongs 107 of the crane mechanism H and delivered to a specified point.

The compacted refuse blocks W can be loaded on trucks and/or transported by any conventional and suitable means to a reclamation site such as a sea embankment or the like, or to a dumping area, an incineration plant or the like, for effective utilization or disposal of the refuse blocks.

It should be noted that for the sake of clearer illustration no conduits for feeding hydraulic fluid to and from the respective oil-pressure cylinders have been shown in the various figures. These are however conventional, equipped with control means such as valves, means for providing oil or other hydraulic fluid, and so forth, which are all known to those skilled in the art. Such control means would include a source of hydraulic fluid, an appropriate tank, one or more hydraulic pumps, change-over switches, feed and discharge conduits and other elements required for the selective or independent as well as simultaneous operation of the various hydraulic cylinders.

Similarly, the illustration has been simplified by omitting therefrom conventional control means and coordinating means for a continuous operation of the inventive refuse disposal device, allowing the optional preliminary compacting device, the shaping device, the inserting and removing device, the dropping device, the pushing device, the crane mechanism and/or the moving mechanism to be operated, substantially as described hereinabove.

It will be understood that in the continuous operation of the inventive set-up, consecutive stations can be considered along the rails 1, 1a, constituted by the described devices, including the shaping device B at a first station, the inserting and removing device C at a second station, the dropping device D at a third station, and the pushing device E at a fourth station, with the optional preliminary compacting device A preceding said first station. The device S is also at the first station; the wrapping position P is between the first and second stations; and the crane mechanism H is also at the fourth station. The mobile compression box 43 and the associated moving mechanism 50 . . . 55 are of course reciprocable between the extreme stations B (or A) and E.

The foregoing disclosure relates only to preferred, exemplary embodiments of the invention, which is intended to include all changes and modifications of the examples described, within the scope of the invention as set forth in the appended claims.

What I claim is:

1. A device for refuse disposal by compression, comprising, in combination, means for shaping and compressing the refuse into substantially solid refuse blocks of a predetermined shape, reducing thereby its volume and increasing its apparent specific gravity; said shaping means including a bed, a mobile shaping box whose bottom is carried by said bed, and a force plate vertically reciprocable in said shaping box for treating said refuse; wrapping means in operative alignment with said shaping means, for applying a cover material around the shaped refuse blocks; means for coordinating the successive shaping, wrapping and other steps at least at said shaping and said wrapping means when operating the device in a continuous manner; means for moving said bed and said shaping box away from said force plate; and rails interconnecting said shaping means with said wrapping means, for displacing said shaping box therealong; wherein said wrapping means includes means for dropping an open-top cover case into said shaping box when moved thereunder along said rails, a casing being reciprocably supported above a location spaced apart from said dropping means, said casing being open at the top and the bottom, and of a dimension fitting into said shaping box; and means for inserting said casing into and removing the same from inside said cover case within said shaping box, for guiding the insertion of said shaped refuse block into said cover case.

2. The device as defined in claim 1, wherein said cover material is shaped into a cover case open on one side.

3. The device as defined in claim 1, further comprising preliminary compacting means associated with and adjoining said shaping means; said compacting means including a compacting box having an inlet for said refuse to be introduced thereinto, a compacting member horizontally reciprocable in said compacting box for pre-compacting and advancing said refuse, and door means opposite said compacting member for discharging the pre-compacted refuse blocks.

4. The device as defined in claim 3, wherein said shaping box has on its top an intake for receiving said pre-compacted refuse blocks from said compacting means, and the latter is disposed so that said pre-compacted refuse blocks discharged by way of said door means can drop into said intake by gravity.

5. The device as defined in claim 1, wherein said shaping means is associated with pushing means at a location rectilinearly aligned with said shaping and said wrapping means, for removing said shaped refuse blocks from said shaping box, including an elevator plate vertically reciprocable and insertable in an opening provided in said bottom of the shaping box and slidable therein, and means for reciprocating said elevator plate, whereby said shaped refuse blocks are pushed out from said shaping box when said elevator plate is moved toward the top of said shaping box.

6. The device as defined in claim 1, wherein said rails include portions in the region of said shaping means, separate from the remaining portions thereof, further comprising means for supporting said separate rail portions in an elevatable manner above said bed, including cam means for elevating said separate rail portions, so that said bottom of the shaping box directly rests on said bed when said separate rail portions are lowered.

7. The device as defined in claim 1, wherein said inserting means includes tongs means for holding said casing, means for selectively opening, closing, elevating and lowering said tongs means, a pressing plate vertically reciprocable within said casing while the latter is lifted out of said shaping box by the aid of said tongs means, and means for reciprocating said pressing plate.

8. The device as defined in claim 1, wherein said cover case has lateral flaps extending around the top edges of said shaping box, said wrapping means further including levers carried by the side walls of said shaping box for closing said extending flaps of the cover case, and means for reciprocating said levers.

9. The device as defined in claim 1, further comprising control means allowing said shaping means, said wrapping means, said moving means, said dropping means and said inserting means to be selectively operated independently from each other so as to achieve continuous operation of the device.

10. The device as defined in claim 1, further comprising a number of successive stations disposed along said rails for providing continuous operation of the device; said shaping means being at a first station at one end of said rails, said inserting and removing means at a successive, second station, and said dropping means being at a third station; further comprising pushing means at another successive, fourth station at the other end of said rails, for removing said shaped refuse blocks from said shaping box; said moving means being successively actuated to displace said mobile shaping box during each operational cycle from said fourth to said third, said second, said first, again said second, and finally back to said fourth station; said coordinating means being successively actuated to energize the various means at said stations, so as to perform the operations of dropping said cover case into said shaping box at said third station, inserting said casing inside said cover case at said second station, inserting said shaped refuse block inside said casing at said first station, removing said casing from between said cover case and said shaped refuse block at said second station, and pushing out the shaped, wrapped refuse block from said mobile shaping box at said fourth station.

11. The device as defined in claim 10, further comprising means for returning said mobile shaping box to said first station before its displacement from said second to said fourth station, for performing thereat the intermediate operation of compressing said shaped, wrapped refuse block before being pushed out from said shaping box.

References Cited

UNITED STATES PATENTS

| | | | |
|---|---|---|---|
| 2,884,750 | 5/1959 | Toennies | 53—209 X |
| 3,266,214 | 8/1966 | Kramme | 53—122 |
| 3,307,320 | 3/1967 | Harriss | 53—124 X |
| 3,330,088 | 7/1967 | Dunlea | 53—24 |
| 3,343,334 | 9/1967 | Bode | 53—124 |
| 3,354,600 | 11/1967 | Hoffmann | 53—124 X |
| 3,403,620 | 10/1968 | Pioch | 53—124 |
| 3,405,744 | 10/1968 | Bowman | 53—124 |
| 3,451,185 | 6/1969 | Tezuka | 53—22 |
| 3,451,190 | 6/1969 | Tezuka | 53—124 |

WAYNE A. MORSE, Jr., Primary Examiner

U.S. Cl. X.R.

53—209